(12) United States Patent
Wu

(10) Patent No.: US 8,467,720 B2
(45) Date of Patent: Jun. 18, 2013

(54) METHOD FOR MANAGING MULTIMEDIA BROADCAST MULTICAST SERVICE TRANSMISSION AND RELATED COMMUNICATION DEVICE

(75) Inventor: Chih-Hsiang Wu, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 408 days.

(21) Appl. No.: 12/791,874

(22) Filed: Jun. 2, 2010

(65) Prior Publication Data

US 2010/0317283 A1   Dec. 16, 2010

Related U.S. Application Data

(60) Provisional application No. 61/186,895, filed on Jun. 15, 2009.

(51) Int. Cl.
*H04H 40/00*   (2008.01)

(52) U.S. Cl.
USPC ....... 455/3.06; 455/3.01; 455/414.3; 455/509

(58) Field of Classification Search
USPC .............. 455/3.01, 3.06, 3.03, 414.1, 414.3, 455/452.1, 456.3, 503, 509, 67.11, 422.1, 455/450, 463; 370/329, 312, 328
See application file for complete search history.

(56) References Cited

U.S. PATENT DOCUMENTS

| | | | |
|---|---|---|---|
| 2005/0237972 A1* | 10/2005 | Van Dervelde et al. | 370/329 |
| 2006/0067281 A1 | 3/2006 | Kwak | |
| 2009/0046617 A1* | 2/2009 | Tenny et al. | 370/312 |
| 2010/0272004 A1* | 10/2010 | Maeda et al. | 370/312 |

FOREIGN PATENT DOCUMENTS

| | | |
|---|---|---|
| EP | 1585351 A1 | 10/2005 |
| WO | 2008151069 A1 | 12/2008 |

OTHER PUBLICATIONS

3GPP TS 36.331 V8.5.0, Technical Specification Group Radio Access Network; E-UTRA RRC; Protocol specification (Release 8), Mar. 2009.
3GPP TSG-RAN WG2 Meeting #66, Title: MBMS baseline for Rel-9, R2-092798, May 4, 2009.
European patent application No. 10006181.1, European application filing date: Jun. 15, 2010, European Search Report mailing date: Feb. 24, 2011.
Huawei: "MBSFN Subframe Allocation Signaling", 3GPP TSG-RAN-WG2 Meeting #61bis, R2-081889, Mar. 31-Apr. 4, 2008, XP050139407, Shenzhen, China.
Panasonic: "Scheduling information for Rel-9 MBMS", 3GPP TSG RAN WG2#66, R2-092863, May 4-8, 2009, XP050340681, San Francisco, USA.
Alcatel-Lucent Shanghai Bell, Alcatel-Lucent: "MAC PDU design for eMBMS scheduling", 3GPP TSG-RAN WG2 #66, R2-093093, May 4-8, 2009, pp. 1/4-4/4, XP050340837, San Francisco, US.

* cited by examiner

*Primary Examiner* — John J Lee
(74) *Attorney, Agent, or Firm* — Winston Hsu; Scott Margo

(57) ABSTRACT

A method of managing multimedia broadcast multicast service (MBMS) transmission for a network in a wireless communication system is disclosed. The method comprises the steps of reserving a plurality of MBMS subframes of a first radio frame for a MBMS service; configuring a first subframe set of the reserved MBMS subframes of the first radio frame for transmissions of MBMS data; and configuring a second subframe set of the reserved MBMS subframes of the first radio frame for transmissions of non-MBMS data.

16 Claims, 5 Drawing Sheets

METHOD FOR MANAGING MULTIMEDIA BROADCAST MULTICAST SERVICE TRANSMISSION AND RELATED COMMUNICATION DEVICE

CROSS REFERENCE TO RELATED APPLICATIONS

This application claims the benefit of U.S. Provisional Application No. 61/186,895, filed on Jun. 15, 2009 and entitled "Methods for transmitting and receiving multicast and broadcast messages in wireless communications system" the contents of which are incorporated herein in their entirety.

BACKGROUND OF THE INVENTION

1. Field of the Invention

A method used in a wireless communication system and related communication device are provided, and more particularly to, a method of managing multimedia broadcast multicast service (MBMS) transmission in a wireless communication system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs).

A multimedia broadcast multicast service (MBMS) service has been introduced in LTE specification to give the opportunity to broadcast or multicast TV, film, information such as free overnight transmission of newspaper in digital form and other media in these networks. The broadcast or multicast capability enables to reach unlimited number of users with constant network load. Further, the MBMS also enables the possibility to broadcast or multicast information simultaneously to many cellular subscribers.

Two important scenarios have identified for the MBMS service. One is single-cell broadcast, and the second is MBMS Single frequency network (MBSFN). MBSFN is envisaged for delivering services such as Mobile TV, using the LTE infrastructure. In MBSFN the transmission happens from a tightly time-synchronized set of eNBs, using the same resource block. A UE receiver will therefore observe multiple version of the signal with different delays due to the multi-cell transmission. Since the transmissions from the multiple cells are sufficiently tightly synchronized for each to arrive at the UE, this makes the MBSFN transmission appear to the UE as a transmission from a single large cell, and the UE receiver may treat the multi-cell transmission in the same way as multi-path components of a single cell transmission without incurring any additional complexity.

The MBSFN transmission takes place on dedicated subframes referred to as MBSFN subframes, which would be used for other purpose than MBMS service. For example, the MBSFN subframes can be used for data transmission between relays and the eNB or data transmission for position measurement for the UE. Namely, the MBSFN subframes may be used for non-MBMS data transmission when the MBSFN subframes are not allocated for MBMS data.

The deployment of the MBMS in the LTE system has been defined based on various configurations of geographical cell distribution, carrier frequency allocation (known as "frequency layers") and transmission mode. A geographical area where all eNBs can be synchronized and can perform MBSFN transmission is called an MBSFN synchronization area. Within the MBSFN synchronization area, a group of cells that are coordinated for an MBSFN transmission is called an MBSFN area. Strictly speaking, one cell belongs to only one MBSFN area. Based on such "one-to-one" mapping, the UE served by that cell only read MBSFN subframe configuration associated with that MBSFN area. However, when the multiple MBSFN areas overlap, one cell may serve multiple MBSFN areas simultaneously. The UE in the overlapping area only reads one MBSFN subframe configuration (e.g. the first MBSFN subframe configuration received) in a configuration list. This causes the other MBMS service ignored.

Moreover, mappings between the MBSFN subframe configurations and multicast channel (MCH), multicast control channel (MCCH) and multicast traffic channel (MTCH) have not been described explicitly in the current LTE specification. The MCTH is a point-to-multipoint downlink channel for transmitting data traffic from the network to the UE. The MCCH is a point-to-multipoint downlink channel used for transmitting MBMS control information form the network to the UE. Both the MCCH and the MTCH are mapped to the MCH transport channel in the MBSFN operation. The MCH is used to transport user data or control message for the MBSFN operation.

In short, allocation/configuration of the MBSFN subframe and corresponding channels, e.g. MCH/MCCH/MTCH, need appropriate handling to improve MBMS resource utilization.

SUMMARY OF THE INVENTION

A method of managing multimedia broadcast multicast service (MBMS) transmission in a wireless communication system is disclosed to teach how to use reserved MBMS subframes for MBMS data transmission and non-MBMS data transmission.

A method of managing multimedia broadcast multicast service (MBMS) transmission for a network in a wireless communication system is disclosed. The method comprises the steps of reserving a plurality of MBMS subframes of a first radio frame for a MBMS service; configuring a first subframe set of the reserved MBMS subframes of the first radio frame for transmissions of MBMS data; and configuring a second subframe set of the reserved MBMS subframes of the first radio frame for transmissions of non-MBMS data.

A communication device for managing multimedia broadcast multicast service (MBMS) transmission in a wireless communication system is disclosed. The communication device comprises a means for reserving a plurality of MBMS subframes of a first radio frame for a MBMS service, a means for configuring a first subframe set of the reserved MBMS subframes of the first radio frame for transmissions of MBMS data and a means for configuring a second subframe set of the reserved MBMS subframes of the first radio frame for transmissions of non-MBMS data.

A method of managing multimedia broadcast multicast services (MBMS) reception for a mobile device in a service overlapping area is disclosed. The service overlapping area comprises a plurality MBMS services. The method comprises the steps of receiving a first configuration associated with the first MBMS service and a second configuration associated with a second MBMS service; and reading the first configuration associated with the first MBMS service and the second configuration associated with a second MBMS service.

A communication device for managing multimedia broadcast multicast services (MBMS) reception in a service overlapping area is disclosed. The service overlapping area comprises a plurality of MBMS services. The communication device comprises a means for receiving a first configuration associated with a first MBMS service and a second configuration associated with a second MBMS service; and a means for reading the first configuration associated with the first MBMS service and the second configuration associated with the second MBMS service.

These and other objectives of the present disclosure will no doubt become obvious to those of ordinary skill in the art after reading the following detailed description of the example that is illustrated in the various figures and drawings.

DETAILED DESCRIPTION

Figure 1:
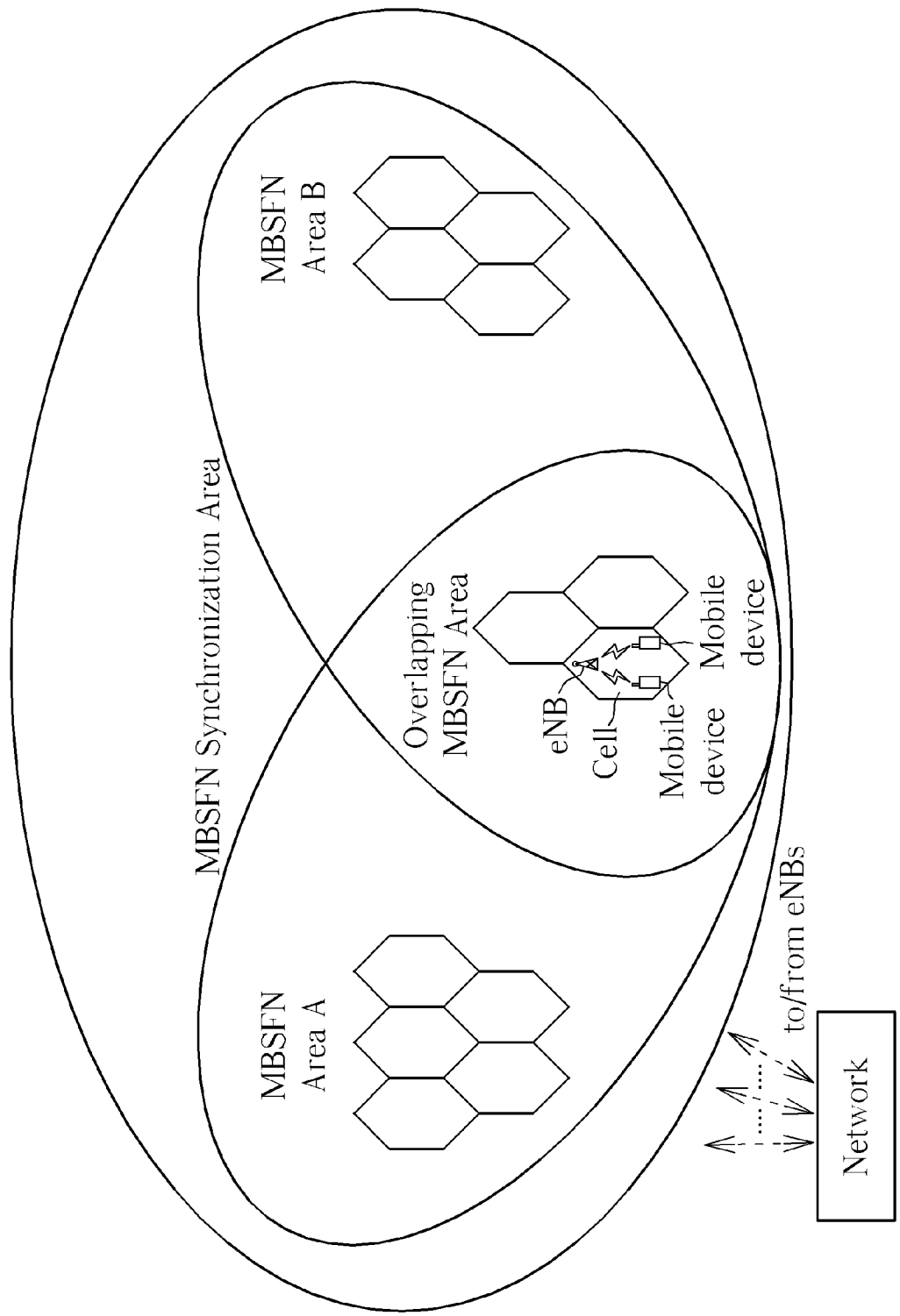
FIG. 1 illustrates a schematic diagram of a wireless communication system according to an example.

Please refer to FIG. 1, which illustrates a schematic diagram of a wireless communication system 10 according to an example. Briefly, the wireless communication system 10 supports multimedia broadcast multicast service (MBMS) services and is composed of a network and a plurality of mobile devices. In FIG. 1, the network and the mobile devices are simply utilized for illustrating the structure of the wireless communication system 10. The wireless communication system 10 can be a UMTS (Universal Mobile Telecommunications System) or an LTE (long-term evolution) system. In the LTE system, the network is referred as a EUTRAN (evolved-UTRAN) comprising a plurality of eNBs, whereas the mobile devices are referred as user equipments (UEs). Each eNB may provide communication coverage for a particular area (called "a cell"). The UEs can be devices such as mobile phones, computer systems, etc. A geographical area where all eNBs can be synchronized and can perform MBMS Single frequency network (MBSFN) transmission is called an MBSFN synchronization area. Within the MBSFN synchronization area, a group of cells that are coordinated for an MBSFN transmission is called an MBSFN area. As shown in FIG. 1, within the (MBSFN) synchronization area, several MBSFN areas overlap geographically and form the overlapping MBSF area. The several MBMS services may be broadcasted in the overlapping MBSFN area. The overlapping MBSFN area would require the allocation of separate resources and signaling to support the different MBMS services transmitted simultaneously in that area. The UE served by a set of cells within the overlapping MBSF area may need to receive different MBMS content from the different MBMS service.

Figure 2:
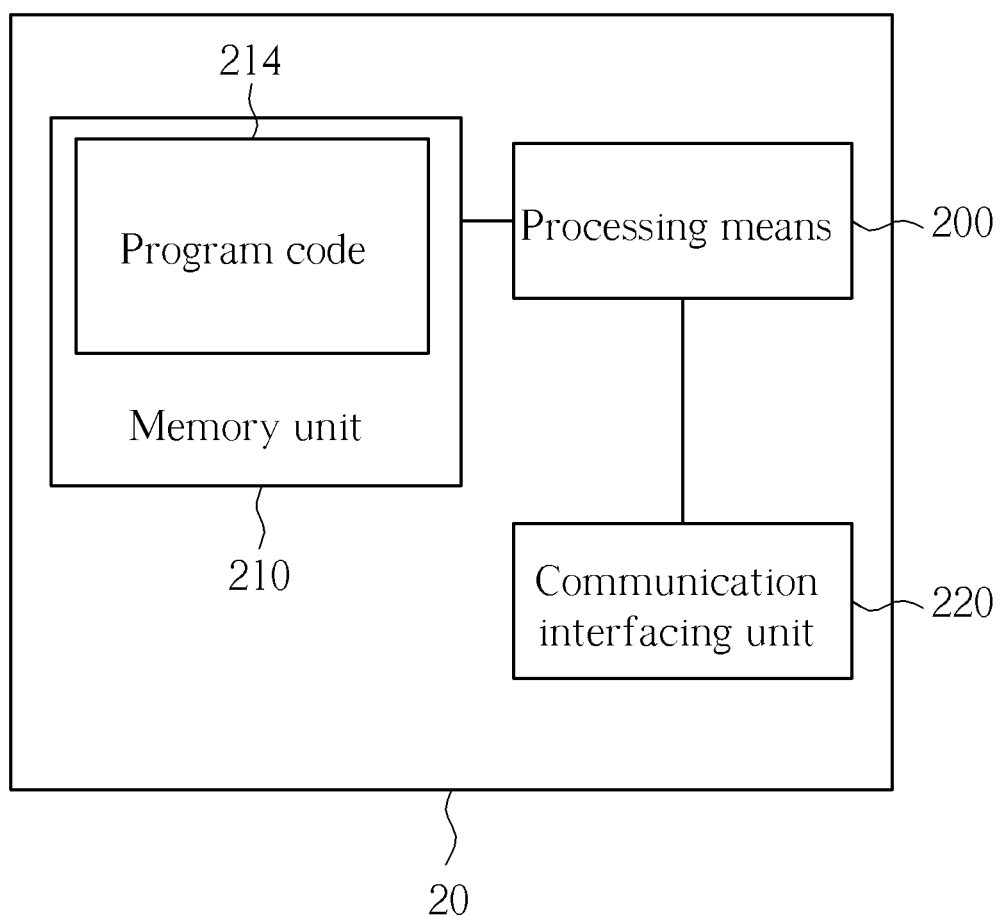
FIG. 2 illustrates a schematic diagram of a communication device according to an example.

Please refer to FIG. 2, which illustrates a schematic diagram of a communication device 20 according to an example. The communication device 20 may be the mobile devices or the network shown in FIG. 1 and may include a processing means 200 such as a microprocessor or ASIC, a memory unit 210 and a communication interfacing unit 220. The memory unit 210 may be any data storage device that can store program code 214 for access by the processing means 200. Examples of the memory unit 210 include but are not limited to a subscriber identity module (SIM), read-only memory (ROM), random-access memory (RAM), CD-ROMs, magnetic tapes, hard disks, and optical data storage devices. The communication interfacing unit 220 may be preferably a radio transceiver and accordingly exchanges wireless signals according to processing results of the processing means 200.

Figure 3:
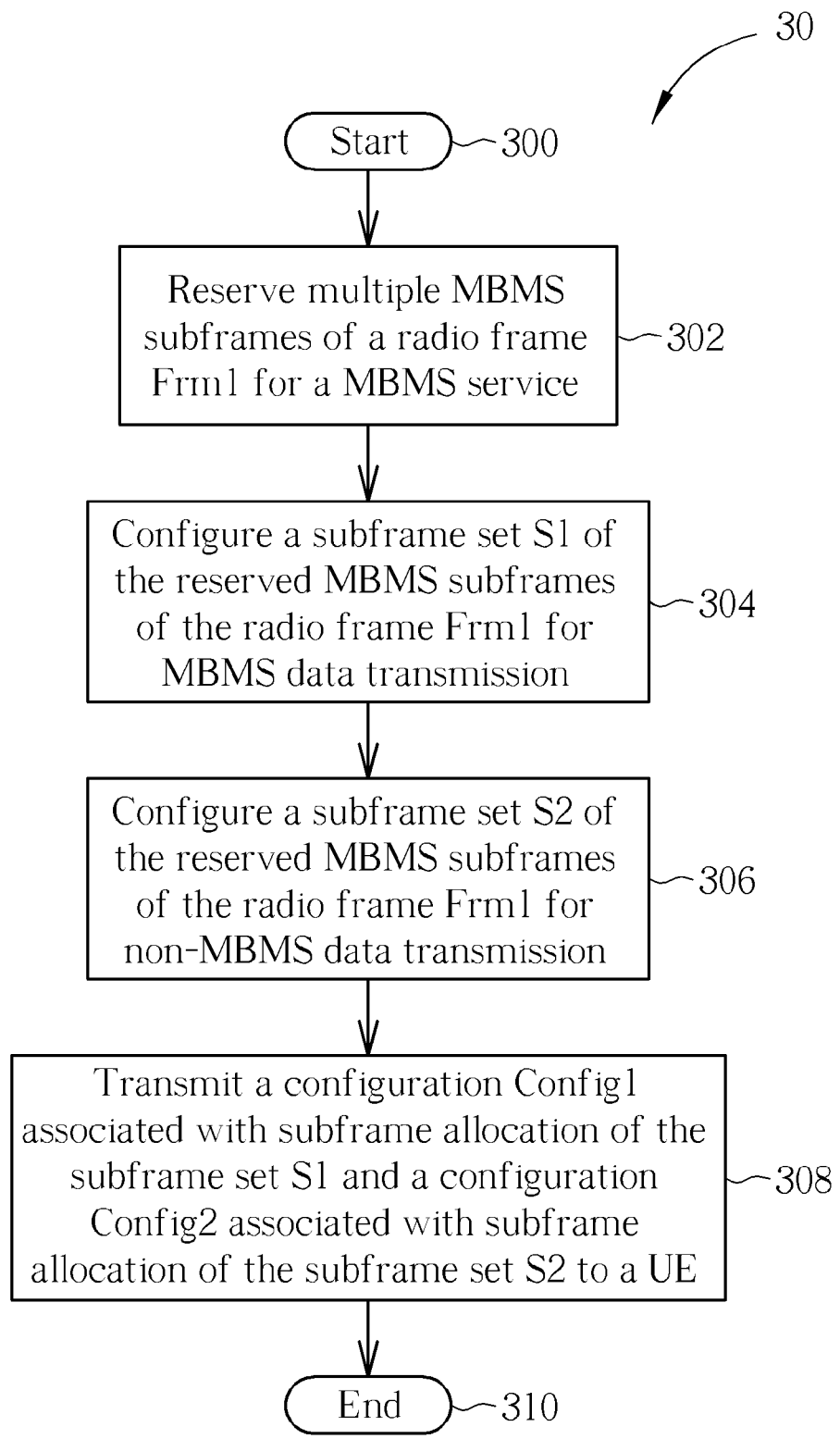
FIG. 3 is a flow chat of a process for a network according to an example.

Please refer to FIG. 3, which is a flow chat of a process 30 according to an example. The process 30 is used for managing MBMS transmission for a network in a wireless communication system. The process 30 can be compiled into the program code 214 and include the following steps:

Step 300: Start.

Step 302: Reserve multiple MBMS subframes of a radio frame Frm1 for a MBMS service.

Step 304: Configure a subframe set S1 of the reserved MBMS subframes of the radio frame Frm1 for MBMS data transmission.

Step 306: Configure a subframe set S2 of the reserved MBMS subframes of the radio frame Frm1 for non-MBMS data transmission.

Step 308: Transmit a configuration Config1 associated with subframe allocation of the subframe set 51 and a configuration Config2 associated with subframe allocation of the subframe set S2 to a UE.

Step 308: End.

According to the process 30, the network may reserve several MBMS subframes of the radio frame Frm1. Then, the network may configure the subframe set S1 of the reserved MBMS subframes for the MBMS data transmission and the subframe set S2 of the reserved MBMS subframes for the non-MBMS data transmission. In the next step, the network may transmit the configuration Config1 and the configuration Config2 to the UE. The Config1 may define the subframe allocation of the subframe set S1 and the Config2 may define the subframe allocation of the subframe set S2. In other words, in one radio frame, the network may use the different configurations including the different subframe sets to transmit the MBMS data and the non-MBMS data. In some examples, after the UE receives the configurations (e.g. Config1 and Config2) sent by the network, based on the received configurations, the UE may exactly know which of the reserved MBMS subframes are used for the MBMS data transmission and which of the reserved MBMS subframes are used for non-MBMS data transmission.

In some example, the MBMS subframes may be referred as to a MBMS Single frequency network (MBSFN) subframes, which is used for sending broadcast and multicast information. In some examples, the wireless communication system may include a relay. The relay is a station that receives a transmission of data and/or other information from an upstream station (e.g. an eNB or a UE) and sends a transmission of the data and/or other information to a downstream station (e.g. a UE or an eNB). Thus, the non-MBMS data may be referred as to data transmitted between the eNB and the relay. In another example, the non-MBMS data may refer to the data used for assisting the UE with position measurement.

As known above, the subframe set S1 and the subframe set S2 may be defined in the Config1 and Config2, respectively (or sometimes called MBSFN subframe configuration). The Config1 explicitly indicates which of the reserved subframes are allocated to the subframe set S1. The Config2 explicitly indicates which of the reserved subframes are allocated to the subframe set S2. For example, the radio frame Frm1 includes ten MBSFN subframes subfrm1, subfrm2 ... subfrm10. And, a total of five subframes (subfrm1, subfrm4, subfrm5, subfrm7, subfrm 10) are reserved for the MBMS service. The subframe set S1 is defined in the Config1 by enumerating S1={sunform1, subfrm4, subfrm5} and used for the MBMS data transmission. The subframe set S2 is defined in the Config2 by enumerating S2={subfrm7, subfrm10} and used for non-MBMS data transmission.

It is more likely for the network to have more than two configurations. The different configurations may define the different allocation ways for the reserved MBMS subframes. In addition, the different configurations may be used for the different data transmission or the same data transmission. Those configurations may be sent in system information and read by the UE. The system information is structured by means of system information blocks (SIBs), each of which contains a set of functionality-related parameters. Besides the Config1 and Config2, the network may transmit two other configurations (Config3 and Config4) to the UE, which may be included in the system information. The Config1 and the Config3 may be used for the MBMS data transmission, and individually define MBMS subframe allocations. The Config2 is used for the data transmitted between the aforementioned relay and the eNB. The Config4 is used for the data for UE position measurement. When the UE receives the system information, the UE only needs to read the configurations of interest. For example, the UE may only read the Config1 and Config3 for the MBMS data transmission and ignore the others. In some examples, the system information may not inform the UE of the purposes of the configurations. That is, the UE may not know which configurations are used for the MBMS data transmission and which configurations are used for the non-MBMS data transmission. In this situation, the UE may read and decode all possible configurations.

In some examples, MBMS subframe overlapping may be allowed among the different configurations to make the usage of the reserved MBMS subframes more flexible. Namely, one or more reserved MBMS subframes may be shared in one or more configurations. Take the aforementioned Config4 for an example, likewise, the MBMS subframes (subfrm1, subfrm4, subfrm5, subfrm7, subfrm 10) are reserved for the MBMS service, the Config4 may define a subframe set S4 containing three subframes (subfrm1, subfrm7, subfrm10) for the non-MBMS data transmission. As defined above, the Config1 have three subframes (sunform1, subfrm4, subfrm5) used for the MBMS data transmission. Apparently, the subframe subfrm1 may be used both for the MBMS data transmission in the Config1 and for the non-MBMS data transmission in the Config4. In this situation, the network may use the subframe subfrm1 of the radio frame Frm1 to transmit the MBMS data and then, in a radio frame Frm2 following the radio frame Frm1, use corresponding subframe subfrm1 to transmit the non-MBMS data, and so on. Thus, the MBMS resources have flexibility and can be fully utilized. This, undoubtedly, enhances capacity and efficiency of data transmission.

Figure 4:
FIGS. 4-6 illustrate mapping between the configuration(s) and the MCH(s)/MTCH(s)/MCCH(s) according to an example.
Figure 5:
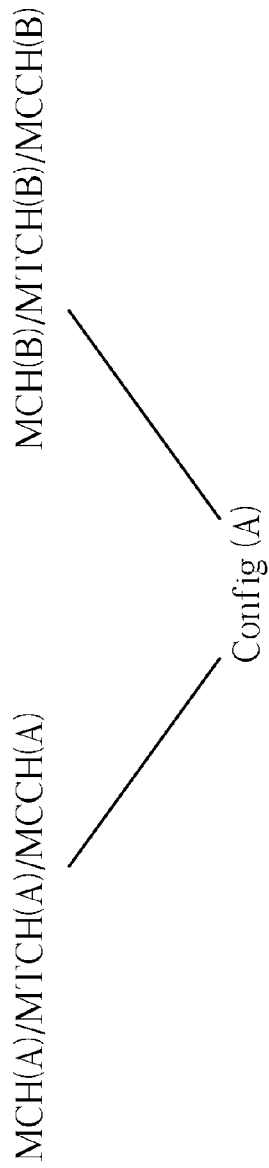
Figure 6:
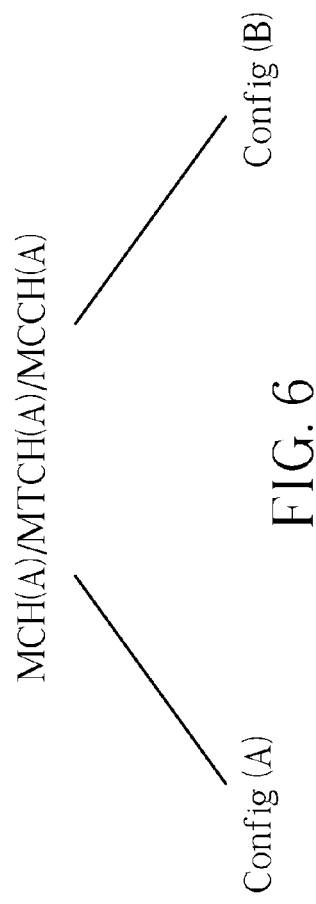

In some example, the aforementioned system information not only includes configurations, but also includes mapping between the configurations and UE channels, such as multicast channels (MCHs), multicast traffic channels (MTCHs) and multicast control channels (MCCHs). The mapping between the configuration(s) and the MCH(s)/MTCH(s)/MCCH(s) may include a "one-to-one" mapping, "many-to-one" mapping and "one-to-many" mapping. For "one-to-one" mapping, one configuration may be mapped to one MCH/MCCH/MTCH. For "many-to-one" mapping, several configurations may be mapped to one MCH/MCCH/MTCH. For "one-to-many" mapping, one configuration may be mapped to several MCHs/MCCHs/MTCHs. Please refer to FIGS. 4-6, which illustrate mappings between the configuration(s) and the MCH(s)/MTCH(s)/MCCH(s) according to an example. In FIG. 4, a Config (A) and Config(B) are mapped to a MCH(A)/MTCH(A)/MCCH(A) and MCH(B)/MTCH (B)/MCCH(B), respectively. Namely, the different MCHs/MTCHs/MCCHs may use the different configurations for the MBMS data multiplexing/demultiplexing. In FIG. 5, the Config(A) is mapped to MCH (A)/MTCH (A)/MCCH (A) and MCH (B)/MTCH (B)/MCCH (B), both. Namely, the different MCHs/MTCHs/MCCHs may share the same configuration for the MBMS data multiplexing/demultiplexing. In FIG. 6, the Config(A) and Config(B) are mapped to MCH (A)/MTCH(A)/MCCH(A). Namely, one MCH/MCCH/MTCH use the different configurations for the MBMS data multiplexing/demultiplexing. In another example, the system information broadcast by the network may further include a modulation and coding scheme (MCS) associated with the MCH and MBMS subframe allocation for the MCH. The UE may read the system information and learn which MBMS subframes are used for the MCH.

Figure 7:
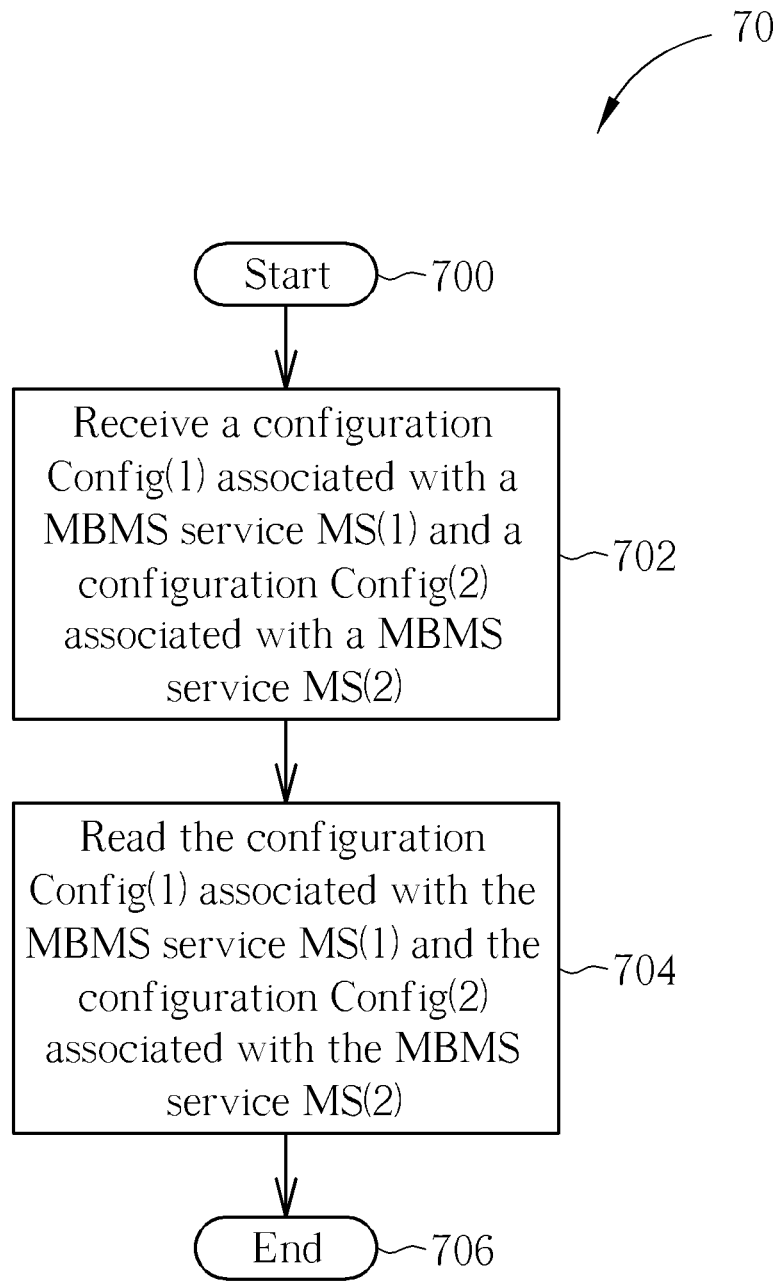
FIG. 7 is a flowchart of a process for a mobile device according to an example.

Please refer to FIG. 7, which is a flowchart of a process 70 according to an example. The process 70 is used for managing MBMS reception for a UE in a service overlapping area of a wireless communication system (e.g. the mobile device 14 in FIG. 1). The service overlapping area may be referred as to an overlapping MBSFN area. The UE may be implemented by the communication device 20. The process 70 can be compiled into the program code 214 and include the following steps:

Step 700: Start.

Step 702: Receive a configuration Config(1) associated with a MBMS service MS(1) and a configuration Config(2) associated with a MBMS service MS(2).

Step 704: Read the configuration Config (1) associated with the MBMS service MS(1) and the configuration Config (2) associated with the MBMS service MS(2).

Step 706: End.

According to the process 70, when the MBMS service MS(1) and the MBMS service MS(2) are broadcasted to the UE, the UE may receive and read the Config(1) and the Config(2), both. The Config(1) may include a MBSFN subframe configuration related to the MBMS service MS(1) and is used for transmitting the MBMS data of the MBMS service MS(1). The Config(2) may include a MBSFN subframe configuration related to the MBMS service MS(2) and is used for transmitting the MBMS data of the MBMS service MS(2).

In accordance with the process 70, the UE may receive and read the different configurations associated to support the different MBMS services. For the different MBMS services, each of configurations may have its own subframe allocation and use the different MBMS subframes. An example is demonstrated below. The Config(1) may define MBMS subframes {subfrm4, subfrm5} for the MBMS data transmission for the MBMS service MS(1). The Config(2) may define MBMS subframes {subfrm7, subfrm10} for the MBMS data transmission for the MBMS service MS(2). Thus, the UE may be able to read both Config(1) and Config(2), supporting two MBMS services. The UE in the overlapping MBSFN area may read one or more configurations associated with the different MBMS services and support the MBMS data transmission for the different MBMS services. In some examples, the aforementioned MBMS subframe overlapping may be allowed among the configurations associated with the different MBMS services.

Note that the process 70 is not limited to two sets of configuration and two types of MBMS services and aims to provide the concept of utilization of multiple sets of configuration associated with overlapped MBMS services.

Please note that the abovementioned steps including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20 in which the processor 200 processes the program code 214 related to the abovementioned processes and the processed results can handle MBMS service transmission and reception.

To sum up, the network reserves the MBMS subframes for the MBMS service and uses the different MBMS subframe configurations to transmit the MBSM data transmission and the non-MBMS data transmission. The MBMS configurations explicitly defining which MBMS subframes should be used for the MBMS data transmission or which MBMS subframes should be used for the non-MBMS data transmission is provided. Then, the network sends the MBMS subframe configurations to the UE. The UE may read any MBMS configuration of interest and decode data on the MBMS subframes defined in the MBMS configuration. In addition, according to the examples, the MBSM subframe overlapping is allowed. Thus, the network can use the same MBMS subframes in the different configurations. The network also explicitly defines mapping between the configurations and MCHs/MTCHs/MCCHs. Furthermore, when the several MBSFN areas overlap and several MBMS services are broadcasted in the overlapping MBSFN area, the UE in the overlapping MBSFN area can read one or more configurations associated with the different MBMS services.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. A method of managing multimedia broadcast multicast service (MBMS) transmission for a network in a wireless communication system, the method comprising the steps of:
reserving a plurality of MBMS subframes of a first radio frame for a MBMS service;
configuring a first subframe set of the reserved MBMS subframes of the first radio frame for MBMS Single frequency network (MBSFN) transmissions of MBMS data; and
configuring a second subframe set of the reserved MBMS subframes of the first radio frame for transmissions of non-MBMS data;
wherein the first subframe set has at least an overlapped subframe with the second subframe set.

2. The method of claim 1, wherein the non-MBMS data comprises at least one of data transmitted between a relay and the network and data for positioning measurement of a mobile device.

3. The method of claim 1 further comprising the step of:
transmitting a first configuration associated with subframe allocation of the first subframe set and a second configuration associated with subframe allocation of the second subframe set to a mobile device.

4. The method of claim 3 further comprising the step of mapping a first configuration and a second configuration onto a multicast channel (MCH), a multicast traffic channel (MTCH), or a multicast control channel(MCCH).

5. The method of claim 3 further comprising the steps of:
mapping the first configuration onto a first MCH, a first MTCH, or a first MCCH; and
mapping the second configuration onto a second MCH, a second MTCH, or a second MCCH.

6. The method of claim 3 further comprising the step of mapping the first configuration or the second configuration onto a plurality of MCHs, MTCHs, or MCCHs.

7. A communication device for managing multimedia broadcast multicast service (MBMS) transmission in a wireless communication system, the communication device comprising:
a means for reserving a plurality of MBMS subframes of a first radio frame for a MBMS service;
a means for configuring a first subframe set of the reserved MBMS subframes of the first radio frame for MBMS Single frequency network (MBSFN) transmissions of MBMS data; and
a means for configuring a second subframe set of the reserved MBMS subframes of the first radio frame for transmissions of non-MBMS data;
wherein the first subframe set has at least an overlapped subframe with the second subframe set.

8. The communication device of claim 7, wherein the non-MBMS data comprises at least one of data transmitted between a relay and the network and data for positioning measurement of a mobile device.

9. The communication device of claim 7 further comprising:
a means for transmitting a first configuration associated with subframe allocation of the first subframe set and the second subframe set and a second configuration associated with subframe allocation of the second subframe set to a mobile device.

10. The communication device of claim 9 further comprising:
mapping the first configuration onto a first MCH, a first MTCH, or a first MCCH; and
mapping the second configuration onto a second MCH, a second MTCH, or a second MCCH.

11. The communication device of claim 9 further comprising mapping the first configuration or the second configuration onto a plurality of MCHs, MTCHs, or MCCHs.

12. The communication device of claim 7 further comprising a means for mapping a first configuration or a second configuration onto a multicast channel (MCH), a multicast traffic channel(MTCH), or a multicast control channel(MCCH).

13. A method of managing multimedia broadcast multicast services (MBMS) reception of a plurality MBMS services for a mobile device, the method comprising the steps of:
receiving a first configuration associated with a first MBMS service and a second configuration associated with a second MBMS service; and
reading the first configuration associated with the first MBMS service and the second configuration associated with a second MBMS service;
wherein the first configuration indicates MBMS subframes allocated for MBMS Single frequency network (MBSFN) data transmission of the first MBMS service and the second configuration indicates MBMS subframes allocated for MBSFN data transmission of the second MBMS service, and at least one of the MBMS subframes allocated for MBSFN data transmission of the first MBMS service is overlapped with at least one of the MBMS subframes allocated for MBSFN data transmission of the second MBMS service.

14. A communication device for managing multimedia broadcast multicast services (MBMS) reception of a plurality MBMS services, the communication device comprising:
a means for receiving a first configuration associated with a first MBMS service and a second configuration associated with a second MBMS service; and
a means for reading the first configuration associated with the first MBMS service and the second configuration associated with the second MBMS service;
wherein the first configuration indicates MBMS subframes allocated for MBMS Single frequency network (MBSFN) data transmission of the first MBMS service and the second configuration indicates MBMS subframes allocated for MBSFN data transmission of the second MBMS service, and at least one of the MBMS subframes allocated for MBSFN data transmission of the first MBMS service is overlapped with at least one of the MBMS subframes allocated for MBSFN data transmission of the second MBMS service.

15. A method of managing multimedia broadcast multicast service (MBMS) transmission of a plurality MBMS services for a network, the method comprising the steps of:
transmitting a first configuration associated with a first MBMS service and a second configuration associated with a second MBMS service;
wherein the first configuration indicates MBMS subframes allocated for MBMS Single frequency network (MBSFN) data transmission of the first MBMS service and the second configuration indicates MBMS subframes allocated for MBSFN data transmission of the second MBMS service, and at least one of the MBMS subframes allocated for MBSFN data transmission of the first MBMS service is overlapped with at least one of the MBMS subframes allocated for MBSFN data transmission of the second MBMS service.

16. A communication device for managing multimedia broadcast multicast services (MBMS) transmission of a plurality of MBMS services, the communication device comprising:
a means for transmitting a first configuration associated with a first MBMS service and a second configuration associated with a second MBMS service;
wherein the first configuration indicates MBMS subframes allocated for MBMS Single frequency network (MBSFN) data transmission of the first MBMS service and the second configuration indicates MBMS subframes allocated for MBSFN data transmission of the second MBMS service, and at least one of the MBMS subframes allocated for MBSFN data transmission of the first MBMS service is overlapped with at least one of the MBMS subframes allocated for MBSFN data transmission of the second MBMS service.

* * * * *